United States Patent
Schultz et al.

(10) Patent No.: US 7,577,122 B1
(45) Date of Patent: Aug. 18, 2009

(54) METHOD FOR MINIMIZING RECEIVE PACKET PROCESSING FOR A PERSONAL COMPUTER IMPLEMENTATION OF A WIRELESS LOCAL AREA NETWORK ADAPTER

(76) Inventors: Richard Douglas Schultz, 4309 Ligustrum Dr., Melbourne, FL (US) 32934; John Erich Hoffmann, 516 Latania Palm Dr., Indialantic, FL (US) 32903

( * ) Notice: Subject to any disclaimer, the term of this patent is extended or adjusted under 35 U.S.C. 154(b) by 1102 days.

(21) Appl. No.: 10/460,684

(22) Filed: Jun. 12, 2003

Related U.S. Application Data

(60) Provisional application No. 60/389,677, filed on Jun. 18, 2002.

(51) Int. Cl.
*H04W 4/00* (2006.01)
(52) U.S. Cl. .................. 370/338; 370/349; 370/389
(58) Field of Classification Search ............ 370/252, 370/229, 216, 241, 503, 500, 392, 338, 349, 370/389, 394, 401, 465, 474; 375/224
See application file for complete search history.

(56) References Cited

U.S. PATENT DOCUMENTS

| | | | | |
|---|---|---|---|---|
| 5,345,440 A * | 9/1994 | Gledhill et al. | ............. | 370/210 |
| 5,553,081 A * | 9/1996 | Downey et al. | ............. | 714/709 |
| 6,108,561 A * | 8/2000 | Mallinckrodt | ............... | 455/522 |
| 6,754,170 B1 * | 6/2004 | Ward | ............. | 370/208 |
| 7,061,873 B2 * | 6/2006 | Ito et al. | ............. | 370/252 |
| 7,065,125 B1 * | 6/2006 | Miller et al. | ............. | 375/130 |
| 7,099,267 B2 * | 8/2006 | Moon | ............. | 370/206 |
| 2001/0033611 A1 * | 10/2001 | Grimwood et al. | ............. | 375/219 |
| 2002/0015423 A1 * | 2/2002 | Rakib et al. | ............. | 370/485 |
| 2003/0135797 A1 * | 7/2003 | Choi | ............. | 714/704 |
| 2004/0032856 A1 * | 2/2004 | Sandstrom | ............. | 370/351 |
| 2007/0066259 A1 * | 3/2007 | Ryan et al. | ............. | 455/234.1 |

* cited by examiner

*Primary Examiner*—Brian D Nguyen
(74) *Attorney, Agent, or Firm*—McDonnell Boehnen Hulbert & Berghoff LLP

(57) ABSTRACT

A method and wireless local area network (WLAN) adapter for the reduction of receive packet processing in a communications system receiver. The method includes establishing a set of criteria which identifies a packet as one requiring demodulation. The method further includes detecting a packet preamble to trigger at least one waveform identification function and determining with the at least one waveform identification function of the detected packet meets an established criteria for demodulation. The established criteria may include at least one of data rate, modulation type, signal to noise ratio, or coding rate. If the detected packet meets the established criteria for demodulation, a host processor may be interrupted to begin demodulation.

18 Claims, 7 Drawing Sheets

OFDM DATA Symbol Receive Processing - Waveform Identification

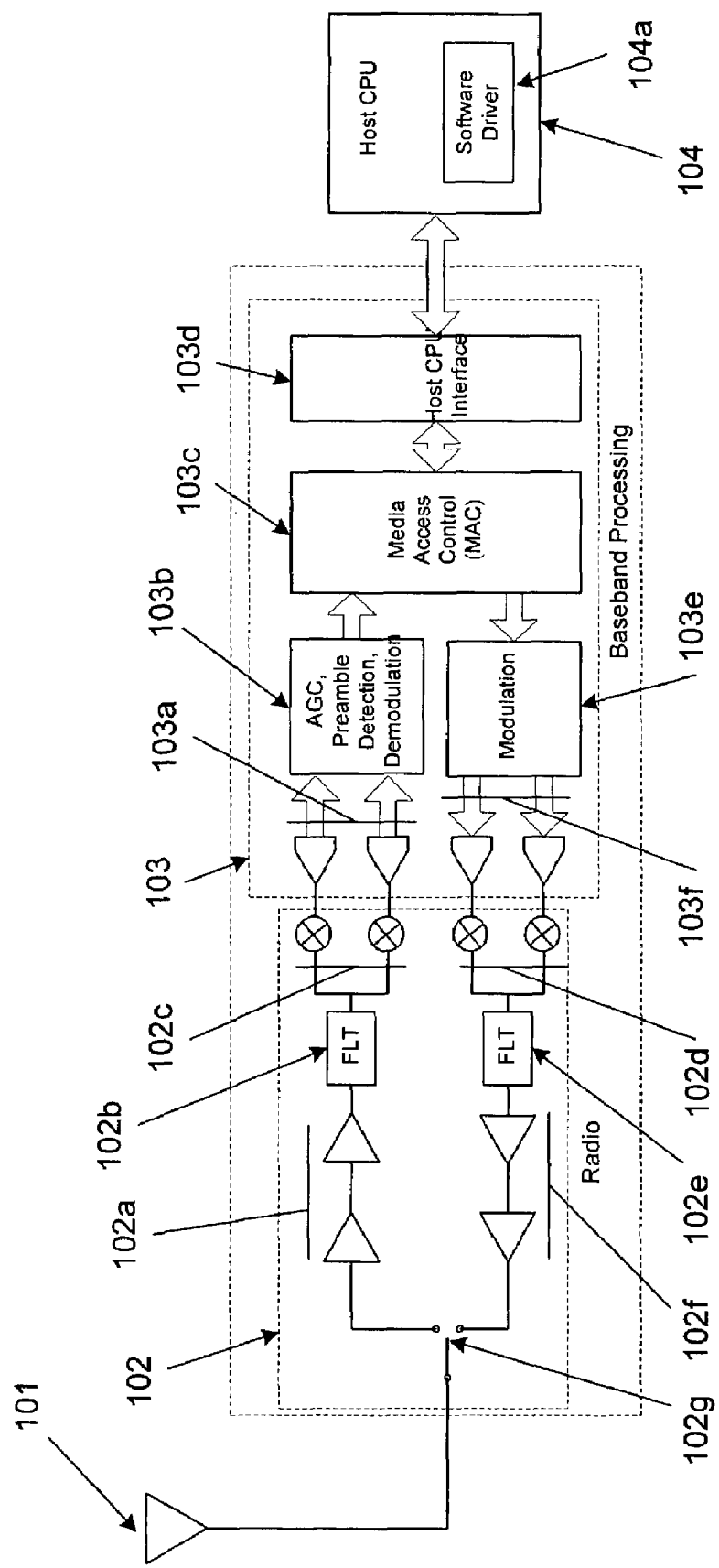
Prior Art WLAN Adapter
Figure 1.0

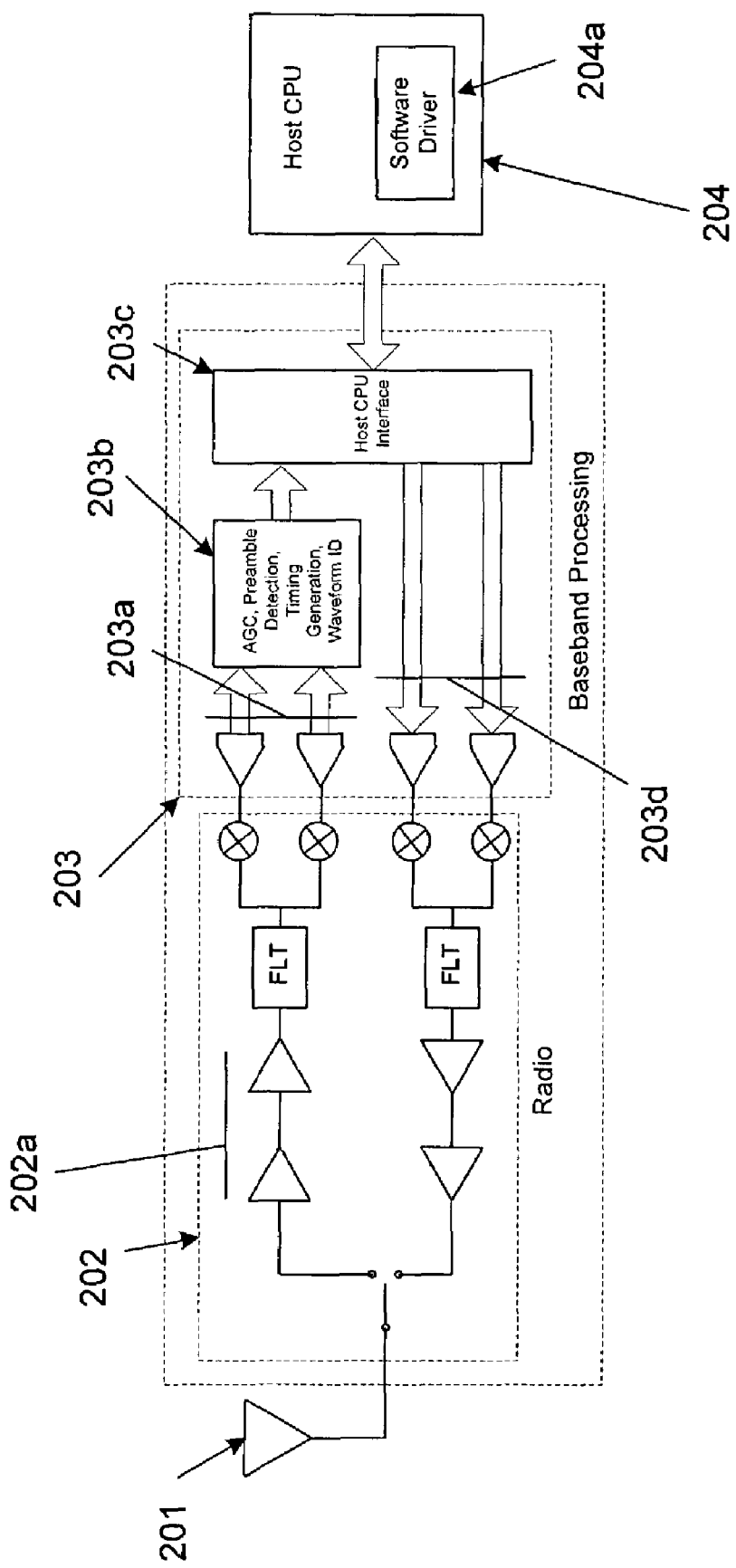
WLAN Adapter utilizing a PC Host CPU for MODEM and MAC processing
Figure 2.0

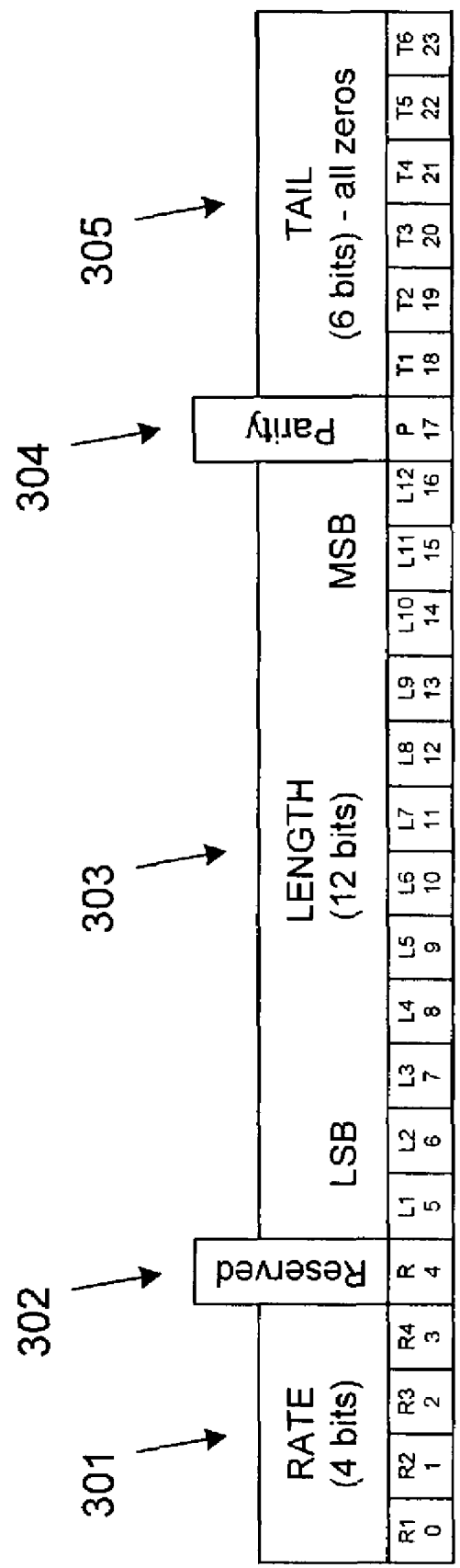
Figure 3.0 OFDM SIGNAL field bit assignments

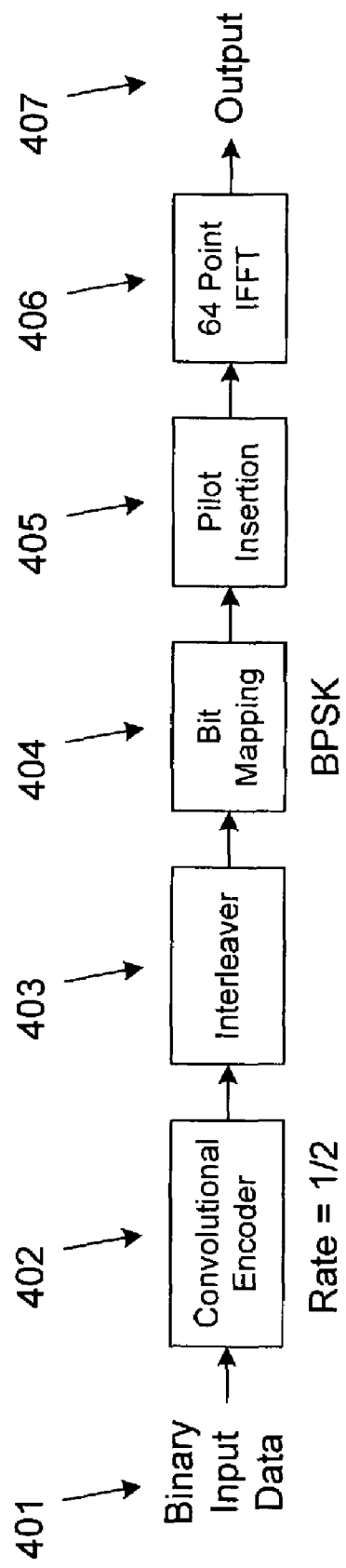
Figure 4.0
OFDM SIGNAL Symbol Transmit Processing

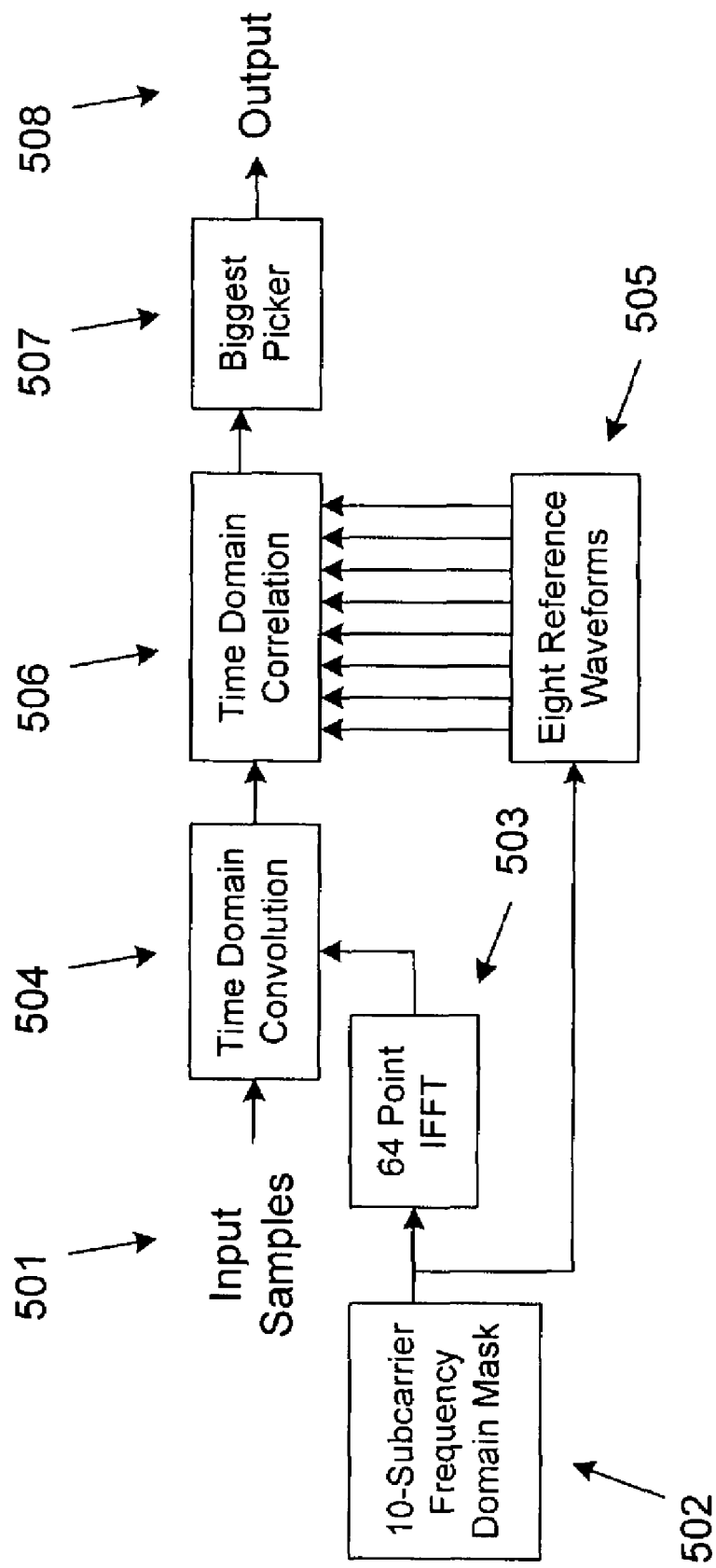
OFDM SIGNAL Symbol Receive Processing - Waveform Identification
Figure 5.0

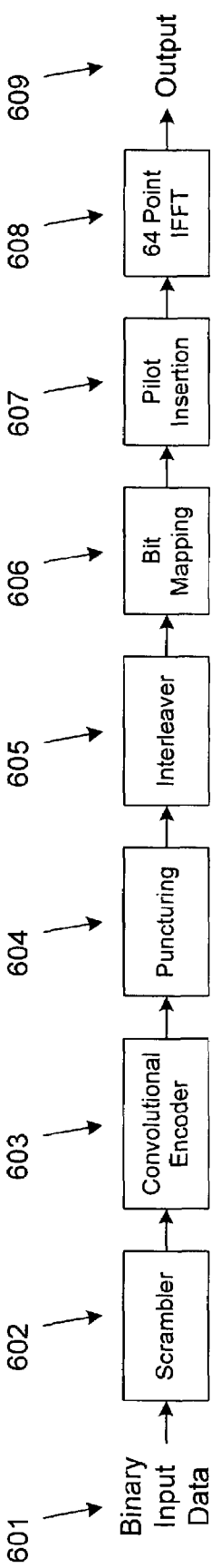
OFDM DATA Symbol Transmit Processing
Figure 6.0

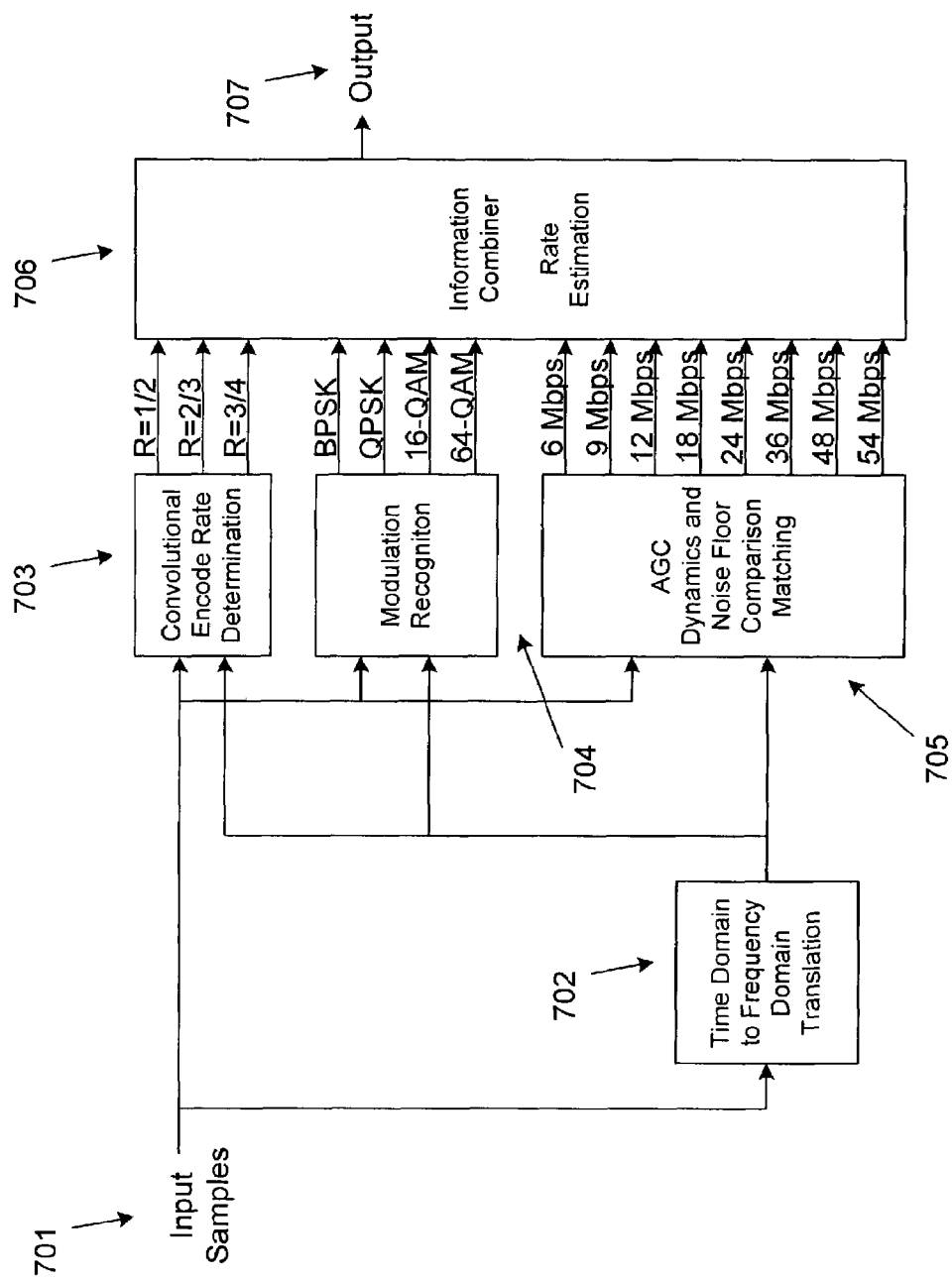
OFDM DATA Symbol Receive Processing - Waveform Identification
Figure 7.0

METHOD FOR MINIMIZING RECEIVE PACKET PROCESSING FOR A PERSONAL COMPUTER IMPLEMENTATION OF A WIRELESS LOCAL AREA NETWORK ADAPTER

This invention claims the benefit of priority to U.S. Provisional Patent Application No. 60/389,677 filed Jun. 18, 2002.

This invention relates to electronic communications systems and more particularly to a system for enabling a computer to transmit and receive information over a packet based wireless communications link.

BACKGROUND OF THE INVENTION

The host microprocessor of personal computers (PC) has been used to provide the signal processing functions required to implement wireline analog communications functions for some time. The modulator demodulator (MODEM) functions required to implement existing wire line standards were historically implemented in software running on dedicated signal processors on the modem hardware. With the advent of more and more powerful personal computers it became possible to implement much of the processing software on the host processor within the PC. Using the host processor instead of dedicated signal processors greatly reduces the cost of the MODEM hardware. If the host processor is powerful enough, the impact on other application running on the host is relatively small when MODEM processing is performed.

The advent of small low cost radios and small portable notebook computers has spurred the recent growth of wireless local area networks (WLAN). These networks are high bandwidth (>1 Mb/s) half duplex packet networks, which contrast with the wire line networks, which are relatively low bandwidth (<56 kb/s), full duplex, and circuit switched. The same cost savings gained in the wire line network adapters by moving the MODEM functions from dedicated hardware to the PC host processor is theoretically possible with WLAN adapters. However, the bit rates and thus the amount of processing required for WLAN adapters is much higher than that of the wire line adapters. On the surface it would appear that the processing required by the WLAN adapter would make the load on the PC host microprocessor prohibitive.

There are several features of the WLAN waveforms and protocol which can be exploited to allow the host processor in a PC to perform the MODEM functions without significant impact to other applications running on the host processor. First, the WLAN protocol is half duplex, which dictates the host processor is never required to process both transmit and receive waveforms simultaneously. Second, the WLAN protocol is packet based, which means the host processor is not required to process data in a continuous fashion. Third, since the protocol is packet based, every packet is preceded by a preamble. The preambles can be used to trigger the host processor to perform MODEM processing only when valid packets arrive at the receiver.

Furthermore, features in each receive packet can be identified to determine if the MODEM functions should be required to be executed for the packet of interest. Rate determination of each packet can be estimated and, if greater than that anticipated or assigned by the media access control (MAC) layer, these packets can be ignored. As well, rates not supported by the current MODEM (i.e. optional rates) if detected can be ignored. Waveforms that appear to be of higher order modulation or higher code rate than expected by the MODEM can be ignored when detected. In summary, there is no reason to interrupt the host processor for packets with incorrect data rates or rates incompatible with those supported by the current MODEM implementation.

SUMMARY OF THE INVENTION

A primary objective of the present invention is to provide a technique for enabling a personal computer to transmit and receive information over a packet based wireless communications link at very low cost by using the personal computers central processing unit (CPU) to perform most of the communications link processing.

A secondary objective is to minimize unnecessary host CPU interrupts for non-essential receive packets of a packet based wireless communications link in such a way as to minimize the processing load on the CPU so that it can be used simultaneously for both wireless packet data and other desktop applications.

The present invention attempts to minimize the receive packet processing required by the host central processing unit of a personal computer. If it can be determined at the interface card whether a packet has high probability of being destined for this user, the analog to digital converter (ADC) samples will be relayed to the host CPU via an interrupt. Each packet that can be thrown out of that set, based on waveform identification and classification done at the interface card, is one less interruption of the host CPU and its other activities. Various methods are described to classify receive packets on the interface card. These can be used independently or weighted together for a more confident decision. One involves determining the RATE bits of the SIGNAL field in the physical layer convergence procedure (PLCP) header by time or frequency domain correlation against a set of reference waveforms. Another attempts to determine the modulation type used in the orthogonal frequency division multiplex (OFDM) DATA symbols of the physical protocol data units (PPDU) frame. Identification of the convolutional encoder rate used helps filter packets from either the mandatory or optional set. Finally, the dynamics of the response of the automatic gain control (AGC) to the start of a new packet can potentially indicate how much new energy above the noise floor is included in this packet. Packets running the higher data rates must obviously have much higher signal to noise ratio (SNR) to be able to be demodulated properly. If there is not a significantly large variation and reaction in the AGC response when a high modulation type is expected, the chance of a proper demodulation is limited.

BRIEF DESCRIPTION OF THE DRAWINGS

FIG. 1.0 is a top level block diagram of a prior art WLAN adapter.

FIG. 2.0 is a block-schematic diagram of a WLAN adapter which relies on the central processor unit (CPU) of a personal computer (PC) to perform MODEM and MAC functions.

FIG. 3.0 is a diagram of the OFDM SIGNAL field bit assignments.

FIG. 4.0 is a diagram of the transmit processing flow for the OFDM SIGNAL symbol.

FIG. 5.0 is a diagram of the receive processing flow required for the OFDM SIGNAL symbol waveform identification.

FIG. 6.0 is a diagram of the transmit processing flow for the OFDM DATA symbols.

FIG. 7.0 is a diagram of the receive processing flow required for the OFDM DATA symbols waveform identification.

DETAILED DESCRIPTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Wireless Local Area Networks (WLAN), such as that standardized by the Institute of Electrical and Electronics Engineers (IEEE) 802.11, were designed to provide un-tethered access to information sources such as the Internet and enterprise file systems. The WLAN allows standard Internet protocol (IP) traffic to be transmitted using radio frequencies (RF) eliminating the need for a hardwired Ethernet connection common on wired local area networks (LAN). Just as in wired networks, the physical interface to the network is implemented on what is known as a network adapter or just adapter. In prior art, the WLAN service was provided to the applications (file managers, Internet browsers, etc.) running on a computers host CPU via four components.

The first component is a software device driver allowing the application on the host CPU to access the WLAN service through a common interface such as a transmission control protocol (TCP) stack. The software driver provides the interface between the TCP stack and the MAC functions, which are specific to the WLAN.

The MAC function provides the support protocol required to transport the IP traffic or packets over the wireless medium. The MAC provides data rate and error control as well as congestion management. The MAC also provides the interface between the software driver and the physical layer MODEM functions. In prior art the MAC function was implemented on a dedicated processor located on the WLAN adapter.

The MODEM provides the mapping of the payload data (IP packets) and control data to a form more conducive to wireless transmission and reception. The modulation functions in prior art would include scrambling, interleaving, puncturing, encoding, mapping, and filtering of bits onto the channel. The demodulation functions in prior art would include filtering, de-mapping of bits from the channel, decoding, de-interleaving and de-scrambling. In prior art the MODEM functions were provided via dedicated hardware on the WLAN adapter.

The final function required for implementation of a WLAN adapter is the radio. The radio is used to translate the base-band waveform generated and used by the MODEM up and down to RF frequencies. In prior art the radio functions were provided via dedicated hardware on the WLAN adapter.

FIG. 1.0 outlines the major components of prior art WLAN adapters. The four components are the software driver (104*a*) running on the host CPU (104), MAC functions (103*c*), MODEM functions (103*b*, 103*e*), and radio (102). The software driver (104*a*) communicates with the MAC (103*c*) through an interface (103*d*). This interface is normally a standardized bus type such as peripheral component interface (PCI), PC Card etc. The MAC receives data from the wireless medium via demodulation functions (103*b*) and provides data to the wireless medium via the modulator functions (103*e*). The MODEM functions (103*b*, 103*e*), MAC functions (103*c*), and CPU interface functions (103*d*) constitute the base-band processing functions (103). The base-band processing utilizes analog to digital converters (ADCs) (103*a*) to interface with the receive portion of the radio (102). The base-band utilizes digital to analog converters (DACs) (103*f*) to interface with the transmit portion of the radio (102). The radio consists of two sections, the transmitter (102*d*, 102*e*, 102*f*) and the receiver (102*a*, 102*b*, 102*c*). The radio transmitter receives the analog signal from the base-band processing (103) in a complex format and translates the analog signals to RF using two mixers (102*d*). The result of the mixing operation is then filtered (102*e*) and amplified (102*f*). The transmit/receive (T/R) switch (102*g*) then connects the amplifiers (102*f*) to the antenna (101). In receive mode the T/R switch (102*g*) connects the antenna (101) to the receive amplifiers (102*a*). The result of the amplification is then filtered (102*b*) and down converted to complex base-band analog via two mixers (102*c*). The analog outputs of the mixers are presented to ADCs (103*a*) for processing by the demodulation functions (103*b*).

FIG. 2.0 outlines a WLAN adapter, which uses the host CPU to perform both MAC and MODEM functions. The details of implementing a WLAN adapter using a host CPU to provide both MAC and MODEM functions is more specifically described in United States Provisional patent application Ser. No. 10/428,618 filed May 2, 2003 and that application is hereby incorporated by reference. The radio functions (202) and antenna (201) are identical to that of prior art (FIG. 1.0). However, the MAC functions of prior art are now implemented in the host CPU software driver (204) and no longer exist in the base-band functions (203). In addition, most of the MODEM functions have been implemented in the host CPU software driver (204). The MODEM functions that remain (203*b*) on the adapter have been specialized to require host CPU processing only when valid packets arrive at the receiver or when the wireless medium is available for transmission. The host CPU interface (203*c*) has also been modified to allow the host CPU (204) direct access to various functions previously controlled by the MODEM functions that now reside on the host.

The remaining MODEM functions (203*b*) on the WLAN adapter are automatic gain control (AGC), preamble detection, timing generation, and waveform identification. The AGC function provides control over the receive amplifiers (202*a*) to maintain the correct analog signal level into the ADCs (203*a*). Since this function requires near continuous supervision it must remain an autonomous function of the WLAN adapter. The preamble detection function serves two purposes in prior art WLAN adapters. First, the preamble detector is used to start demodulation processing. Second, the preamble detector is used by the transmitter to sense the availability of the wireless access medium. If the preamble detection function does not detect a valid preamble there is no need to perform demodulation processing. Similarly, if valid preambles are being detected there is no need to perform transmit processing since the wireless medium is being used. This fact allows the host CPU to run autonomously from the WLAN adapter unless valid preambles are being detected indicating that there are data packets arriving at the receiver. The waveform identification function works in conjunction with the preamble detection to filter out packets that are not of interest to this adapter based on data rate, modulation type etc. Once the preamble detection function detects valid packets, which require demodulation and MAC processing, the host CPU can be interrupted to provide the necessary processing.

Limiting the unnecessary demodulation and MAC processing of irrelevant packets is beneficial to the host processor. The current invention exploits specific features in the receive waveforms to reduce the number of interruptions of the host processor for packets that did not really need to be demodulated by the MODEM. Each and every PPDU frame must identify the data rate of the DATA section that contains the payload. Filtering PPDU frames based on their data rate prevents relaying received frames to the host CPU that are not at the correct data rate. What follows is the current invention for determining the data rate contained in each PPDU frame without requiring proper or traditional demodulation and decoding.

FIG. 3.0 illustrates the SIGNAL field portion of the IEEE 802.11a PLCP header. The field consists of a RATE field (301), a Reserved bit (302), a LENGTH field (303), a Parity bit (304) and a Tail field (305).

The RATE field (301) consists of four bits encoded with the data rate and modulation type in the DATA OFDM symbols that follow this PLCP header. Those values are shown below in Table 1. Wireless Local Area Networks (WLAN) such as that standardized in IEEE 802.11a support various payload data rates. Each user in a network, based on his particular signal conditions, has the opportunity to receive one of eight different data rates.

TABLE 1

RATE Bit Definitions

| Data Rate (Mbits/second) | RATE bits (R1, R2, R3, R4) | Modulation | 802.11a Support |
|---|---|---|---|
| 6 | 1101 | BPSK | Mandatory |
| 9 | 1111 | BPSK | Optional |
| 12 | 0101 | QPSK | Mandatory |
| 18 | 0111 | QPSK | Optional |
| 24 | 1001 | 16-QAM | Mandatory |
| 36 | 1011 | 16-QAM | Optional |
| 48 | 0001 | 64-QAM | Optional |
| 54 | 0011 | 64-QAM | Optional |

The Reserved bit (302) is saved for future use and is set to 'zero'.

The LENGTH field (303) shall be an unsigned 12 bit integer that indicates the number of octets in the PLCP service data unit (PSDU) that the MAC is currently requesting the PHY to transmit. This value shall be determined from the LENGTH parameter in the TXVECTOR issued with the primitive used to start a packet transmission. The least significant bit (LSB) (L1) shall be transmitted first in time.

The Parity bit (304) shall represent positive parity (even parity) for the first 17 bits of the SIGNAL field. This covers the RATE (301), Reserved (302), and LENGTH (303) fields.

The TAIL field (305) always consists of six "zero" bits, which are required to return the convolutional encoder to the "zero state." This procedure improves the error correction capability of the convolutional decoder, which relies on future bits when decoding and which may not be available past the end of the SIGNAL message.

FIG. 4.0 outlines the OFDM SIGNAL symbol transmit processing. For each PPDU frame transmitted by an access point (AP), a SIGNAL field in the PLCP Header conveys information about the type of modulation and the coding rate that will be used in the DATA portion of the packet.

The transmitter accepts binary input data (401). The 24 bit SIGNAL field (FIG. 3.0) is manipulated to generate 52 unique carriers for OFDM modulation at the 6 Mbit/s rate. The encoding procedure includes convolutional encoding (402), interleaving (403), modulation mapping (404), pilot insertion (405) and translation from the frequency domain to the time domain via a 64 point inverse fast Fourier transform (IFFT) (406). It is very beneficial that the SIGNAL field is not scrambled. From the 24 bits of the SIGNAL field, we can only really utilize the first four RATE (301) bits plus the Reserved bit (302). These five bits will be tracked through the transmit processing described below.

The first step in the transmit processing is the convolutional encoder (402) in the R=½ configuration. It generates two output bits for every one input bit. The encoder uses the industry standard generator polynomials $g_0$=1338 and $g_1$=1718 with constraint length 7. All convolutional encoders can be implemented using a linear feedforward shift register. Fortunately, this guarantees that the first 10 bits out of the convolutional encoder are only a function of the first 5 bits into the encoder. Bits 11-24 out of the encoder begin to be functions of the non-repeatable LENGTH (303) and Parity (304) fields. After the R=½ convolutional encoder (402), 48 bits have been generated from the original 24 bits of the SIGNAL field. This gives us a bit for each non-pilot OFDM carrier. However, the bits must first be interleaved.

The interleaver (403) is defined as a two-step permutation. The first permutation ensures that adjacent encoded bits are mapped onto nonadjacent sub-carriers. The second ensures that adjacent encoded bits are mapped alternately onto less and more significant bits of the constellation to avoid long runs of low reliability bits. The ordering of 48 bits going into the interleaver is shown below.

1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48.

The first 10 bits out of the convolutional encoder (402) have been indicated in bold. After both permutations of the interleaver, the ordering of bits coming out of the interleaver shown below.

1, 17, 33, 2, 18, 34, 3, 19, 35, 4, 20, 36, 5, 21, 37, 6, 22, 38, 7, 23, 39, 8, 24, 40, 9, 25, 41, 10, 26, 42, 11, 27, 43, 12, 28, 44, 13, 29, 45, 14, 30, 46, 15, 31, 47, 16, 32, 48.

The bits of interest (1-10) have been effectively moved from the left most sub-carriers in the frequency domain to primarily the left half of the frequency domain.

After the interleaver, the 48 bits need to be modulation mapped (404) onto sub-carriers and the pilot sub-carriers need to be inserted (405). The modulation mapping for binary phase shift keying (BPSK) is simple. A binary zero maps to the complex point −1+j0 and a binary one maps to the complex point 1+j0.

As for all OFDM symbols, four sub-carriers are dedicated to pilot signals in order to make the coherent detection robust against frequency offsets and phase. These pilot signals shall be put in sub-carriers −21, −7, 7, and 21. The pilots are BPSK modulated by a pseudo binary sequence to prevent the generation of spectral lines. Fortunately, the pilot tones for the SIGNAL symbol are always the same. They are binary 1, 1, 1, 0 for the four sub-carriers −21, −7, 7, 21, respectively.

The 48 encoded SIGNAL bits now get mapped from left to right across the 52 sub-carriers, skipping the known pilot sub-carrier locations. The last step is to present these 52 sub-carriers to the OFDM modulator (406) for presentation on the wireless media (407). This is done by converting a frequency domain representation to a time domain representation.

FIG. 5.0 outlines the OFDM SIGNAL symbol receive processing required for waveform identification of an unknown RATE field. From the above analysis the 10 sub-carriers which contain the RATE bits and pilot bits have been determined. Input samples (501) arrive at a time domain convolution (504) operation.

At the WLAN adapter, the content of the 38 remaining sub-carriers that are not of interest must be filtered off. To do this, one can use the concept that multiplication in the frequency domain is identical to convolution in the time domain. A mask (502) of the 10 sub-carriers of interest needs to be generated once. This mask (502) is simply the 10 sub-carriers after the interleaving, and pilot padding. Those 10 sub-carriers (mapped to the 64 slots prior to OFDM modulation) are 7, 10, 14, 17, 20, 23, 27, 30, 34, and 37. The six sub-carriers before and the five sub-carriers after are padded with zeros prior to OFDM modulation. The 10 sub-carrier mask is then converted from a frequency domain representation to a time domain representation via the IFFT operator (503). This operation yields the filter impulse response which can be convolved (504) with the received waveform leaving the 10 sub-carriers of interest for RATE determination. That is the information we want and need for RATE determination.

Once the filtering operation is completed to yield the 10 sub-carriers of interest, the determination of RATE is made by cross-correlating (506) the filtered received signal against each of the eight possible transmit waveforms (505) associated with the eight RATE selection options. These reference selections need only to be computed once and stored in memory.

To generate the eight reference waveforms (505), eight unique SIGNAL fields are composed that only contain the four RATE bits (301) and the Reserved bit (302). The other 19 bits are left at zero. Each of these potential SIGNAL fields is run through the convolutional encoder (402), interleaver (403), bit mapping (404), modulation mapping (405), and pilot insertion (406) process. They are then point-by-point multiplied by the frequency domain mask (502) that was generated to make the receive processing filter response. These frequency domain waveforms are converted to time domain representations via the IFFT operator. These operations yield the eight unique time domain RATE correlation references (505).

When time domain samples from the unknown PPDU frame are received, it is filtered using the convolution operator (504) and then cross-correlated (506) against each of the eight RATE reference waveforms (505). The waveform that most closely matches the received waveform will have the largest correlation peak. The biggest picker (507) will indicate which RATE was encoded (508).

Due to the probable lack of time synchronization, the length of the cross-correlation may need to be expanded to guarantee inclusion of the SIGNAL symbol. Various methods exist for minimizing the length of the cross-correlation. An estimation of the transition between the 10 short symbols and the 2 long symbols of the PLCP preamble will generate a timing reference to determine when the SIGNAL symbol is "in the buffer." Once the symbol is in the sample buffer, the cross-correlations against the reference sequences can begin.

FIG. 6.0 outlines the OFDM DATA symbol transmit processing. For each PSDU frame transmitted by an access point (AP), the modulation scheme and convolutional encoder rate identify what ultimate data rate was transmitted.

The transmitter accepts binary input data (601). The variable bit length field is manipulated to generate 52 unique carriers for OFDM modulation at any of the eight possible data rates. The encoding procedure includes scrambling (602), convolutional encoding (603), encoder puncturing (604), interleaving (605), modulation mapping (606), pilot insertion (607) and translation from the frequency domain to the time domain via a 64 point IFFT (608).

The first step in the transmit processing is scrambling (602). The DATA field, composed of the SERVICE, PSDU, tail and pad parts, is scrambled with a length 127 frame synchronous scrambler with generator polynomial $S(x)=x^7+x^4+1$. The scrambler attempts to eliminate long runs of all ones or all zeros from occurring.

The scrambled bits are passed to the convolutional encoder (603). It can be configured in one of three rate configurations ($R=\frac{1}{2}$, $R=\frac{2}{3}$ or $R=\frac{3}{4}$). The encoder uses the industry standard generator polynomials $g_0=133_8$ and $g_1=171_8$ with constraint length 7. All convolutional encoders can be implemented using a linear feedforward shift register. After the convolutional encoder (603), more bits (parity) have been generated from the original input bits of the DATA field.

Depending on which code rate is selected, a different number of bits are punctured (604) prior to interleaving (605). For rate $R=\frac{1}{2}$ no puncturing is done. For rate $R=\frac{2}{3}$, two bits are stolen for every six. For rate $R=\frac{3}{4}$, one bit is stolen for every four.

The interleaver (605) is defined as a two-step permutation. The first permutation ensures that adjacent encoded bits are mapped onto nonadjacent sub-carriers. The second ensures that adjacent encoded bits are mapped alternately onto less and more significant bits of the constellation to avoid long runs of low reliability bits.

After the interleaver (605), the interleaved bits need to be modulation mapped (606) onto sub-carriers and the pilot sub-carriers need to be inserted (607). The modulation mapping for BPSK (1 bit per symbol) is simple. A binary zero maps to the complex point $-1+j0$ and a binary one maps to the complex point $1+j0$. Modulation mapping for the other three schemes is slightly more complicated. In each case the number of bits per symbol increase as we move from quadrature phase shift keying (QPSK) (2 bits per symbol) to 16-QAM (quadrature amplitude modulation) (4 bits per symbol) to 64-QAM (6 bits per symbol).

In all OFDM symbols, four sub-carriers are dedicated to pilot signals in order to make the coherent detection robust against frequency offsets and phase. These pilot signals are on sub-carriers −21, −7, 7, and 21. The pilots are BPSK modulated by a pseudo binary sequence to prevent the generation of spectral lines. The pilot bits are scrambled with the same scrambling sequence (602) used earlier.

The 48 encoded DATA symbols now get mapped from left to right across the 52 sub-carriers, skipping the known pilot sub-carrier locations. The last step is to present these 52 sub-carriers to the OFDM modulator (608) for presentation on the wireless media (609).

FIG. 7.0 outlines the OFDM DATA symbol receive processing required for waveform identification of an unknown forward error correction convolutional encoder rate (703), DATA modulation rate (704), and AGC dynamics and level about the noise floor determination (705). Samples are presented to each of the three waveform identification methods (703, 704 and 705) as either their typical time domain form (701) or after being translated to the frequency domain (702).

A convolutional encoder rate determination (703) investigates the tendencies and trends in the input samples to select which of the three rates ($\frac{1}{2}$, $\frac{2}{3}$ or $\frac{3}{4}$) was used in the OFDM DATA symbols. Deviation from the rate $\frac{1}{2}$ implies separation from the mandatory rate set supported.

A modulation recognition procedure (704) on the first OFDM DATA symbols can detect the difference between BPSK, QPSK, 16-QAM and 64 QAM. Depending on the modulation type detected, and the modulation type that the adapter had been configured for, the PPDU frame may or may not be passed on to the host CPU. This technique involves filtering off specific carriers evenly spaced between the pilots. The modulation scheme used on the pilot tones is known to be BPSK. Those carriers next to the pilot tones can be compared, with high confidence of similar RF impairments, for metrics and statistics that differ. Variance and peak-to-average are good discriminators between QPSK and QAM, especially in the high signal to noise ratios required.

The AGC dynamics measured (705) near the start of each packet can provide an indication of how much additional energy above the previous noise floor has recently arrived. It is known that there is a direct relationship between the demands of more SNR for higher data rates and more complex modulation schemes. Assuming the noise floor relates fairly to the denominator of the signal to noise ratio, relatively speaking, the amount of adjustment required by the AGC loop to converge provides an indication of numerator signal power. Additionally, SNR measurements or SNR estimates may be made on the pre-determined pilot tone locations to determine if a host processor interrupt is warranted if a high data rate is expected.

The information combiner (706) accepts inputs from the convolutional encoder rate determination function (703), the modulation recognition procedure (704) and the measured AGC dynamics (705) to generate a rate estimation (707). Code rate and modulation method along with the environment dynamics and noise floor comparison matching are all considered to determine if the current packet in the sample buffer is intended for this user and warrants host CPU interruption for proper demodulation.

It should be understood by those skilled in the art that the techniques outlined in the above embodiment are not limited to IEEE 802.11 WLAN adapters. Similar techniques can be applied to other wireless packet data standards as well. Bluetooth, IEEE 802.15, as well as newer cellular WAN packet data standards all could be implemented using similar techniques and the host CPU of a personal computer.

The IEEE 802.11b WLAN standard has similar fields as those previously described. The long PLCP PPDU format has the following fields, a 128 bit SYNC field, a 16 bit SFD field, an 8 bit SIGNAL field, an 8 bit SERVICE field, a 16 bit LENGTH field, and finally a 16 bit CRC field. The PLCP will be modulated using 1 Mbit/s DBPSK (differential binary phase shift keying). The RATE information is encoded in the 8 bits of the SIGNAL field. It is either 1 Mbit/s, 2 Mbit/s, 5.5 Mbit/s or 11 Mbit/s. The SERVICE field bit 'b3' indicates whether the modulation method is complementary code keying (CCK) or packet binary convolutional coding (PBCC). Modulation recognition can be performed on the first PSDU symbol. The estimation of the transition between the SYNC and SFD will generate a timing reference to determine when the SIGNAL field is "in the buffer." The short PLCP PPDU frame format starts with a 56 bit shortSYNC and a 16 bit shortSFD also modulated using 1 Mbit/s DBPSK. When the short PLCP PPDU frame format is use, the estimation of the transition between the shortSYNC and shortSFD will generate a timing reference to determine when the SIGNAL field is "in the buffer."

The IEEE 802.11g WLAN standard has parts that are similar to IEEE 802.11a and parts that are similar to IEEE 802.11b. It was intended to inter-operate with the IEEE 802.11b standard so it has a similar PLCP preamble. The PLCP header is also very similar to IEEE 802.11b. The biggest difference with the PLCP header is that the SERVICE field bit 'b0' indicates whether the modulation selection is CCK-OFDM or not CCK-OFDM. The last bits of the SERVICE field will also help indicate if the 22 Mbit/s or 33 Mbit/s option of PBCC is selected. The start of the PSDU looks identical to the previous IEEE 802.11a discussion. The PSDU in IEEE 802.11g may be modulated using either of the four rates of IEEE 802.11b or either of the eight rates of IEEE 802.11a. The modulation methods may be CCK, ERP-OFDM, PBCC or CCK-OFDM. This significantly complicates the modulation recognition task. The additional length of the PLCP preamble, PLCP header and possible OFDM preamble and header will require additional storage requirements for samples. Timing references exist in the same places they do in IEEE 802.11b and IEEE 802.11a.

The IEEE 802.15.1 WPAN standard, also known as Bluetooth, has similar fields in its packet format. A packet may be divided over one or more slots, each of which starts with a 68-72 bit Access Code, a 54 bit Header, then 0-2745 bits of Payload. The Access Code starts with a four bit Preamble, a 64 bit Sync Word and then an optional 4 bit Trailer. The Sync Word is derived from a unique 24 bit address (LAP). The Header has 18 bits of link control information that were ⅓ rate coded for protection to make 54 bits. It starts with a 3 bit active member address, a 4 bit type code, 1 bit for flow control, a 1 bit acknowledge indication, a 1 bit sequence number followed by 8 bits of header error check. The 24 bit LAP address and the 3 bit active member indication help discriminate packets intended for specific users. Broadcast packets will have an all zero active member indication. The 4 bit type code specifies witch of 16 packet types is used. It also reveals how many slots the current packet will occupy. There are three error correction schemes defined for Bluetooth, a ⅓ rate repetition code, a ⅔ rate shortened Hamming code, and an automatic repeat request scheme. The modulation scheme is frequency hopped 1 Mbit/s Gaussian frequency shift keying (GFSK) in time slots. The estimation of the transition between the preamble and the sync word and optional trailer will determine when the active member address is "in the buffer."

The IEEE 802.15.4 WPAN standard, also known as ZigBee has similar fields in its packet format. The three frame formats (beacon, command and data) start with a Preamble sequence, start of frame delimiter (SFD) and a frame length field. A 2 octet Frame Control, 1 octet Data Sequence, and 4 to 20 octet Address Information start the beginning of each MPDU in a command or data frame. The modulation scheme is 1 MHz direct sequence spread spectrum (DSSS) offset quadrature phase shift keying (O-QPSK) with a 250, 40 or 20 kbit/s operation and orthogonal coding (32 chip PN codes). All devices have IEEE addresses and short addresses can be allocated. The configuration can either be star mode (network plus device identifier) or peer-to-peer (source and destination identifier) mode. The MAC header and MAC protocol data unit (MPDU) have similar fields as the IEEE 802.11 family. The estimation of the transition between the preamble and start of frame delimiter will determine when the Address Information of the MPDU is "in the buffer."

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for the reduction of receive packet processing in a communications system receiver comprising the steps of:
   establishing a set of criteria which identifies a packet as one requiring demodulation;
   detecting a packet preamble to trigger at least one waveform identification function;
   determining with the at least one waveform identification function if said detected packet meets an established criteria for demodulation, the established criteria comprising at least one of data rate, modulation type, signal to noise ratio, or coding rate; and interrupting a host processor to begin demodulation if said detected packet meets the established criteria for demodulation.

2. A method as in claim 1, wherein the waveform identification function determines a forward error correction encoding rate used in the packet.

3. A method as in claim 1, wherein the waveform identification function determines the modulation type used in the packet.

4. A method as in claim 1, wherein the waveform identification function utilizes the dynamics of an automatic gain control (AGC) response to estimate a received signal to noise ratio (SNR).

5. A method as in claim 1, wherein the waveform identification function operates on samples that remain in a time-domain representation.

6. A method as in claim 1, in which the waveform identification function operates on samples that have been converted to a frequency-domain representation.

7. A method as in claim 1, in which the waveform identification function operates on samples that exist in either time-domain or frequency domain representation.

8. A method as in claim 1, in which the communications system is wireless.

9. A method as in claim 1, in which the communications system is IEEE 802.11 wireless local area network (WLAN).

10. A method as in claim 1, in which the communications system is Bluetooth.

11. A method as in claim 1, in which the communications system is IEEE 802.12 wireless personal area network (PAN).

12. A method as in claim 1, in which the waveform identification function determines RATE bits of a SIGNAL field in an IEEE 802.11 PLCP header.

13. A method as in claim 1, in which the waveform identification function determines the modulation type used in DATA symbols of an IEEE 802.11 PPDU frame.

14. A method as in claim 1, in which the waveform identification function determines a convolutional encoder rate used to protect a DATA field of an IEEE 802.11 PPDU frame.

15. A wireless local area network (WLAN) adapter for use with a host processor, the WLAN adapter comprising:
a receive amplifier;
an analog-to-digital converter; and
a baseband processor, wherein the adapter is configured to (i) analyze received data from the analog-to-digital converter to detect a packet preamble and to trigger at least one waveform identification function (ii) determine whether the data contains information destined for the host processor by using a waveform detector to determine that the detected packet meets an established criteria for demodulation the established criteria comprising at least one of data rate, modulation type, signal to noise ratio, or coding rate and (iii) selectively transfer samples to the host processor when the data contains information destined for the host processor.

16. The WLAN adapter of claim 15, wherein the baseband processor comprises a preamble detector wherein the preamble detector is configured to determine whether the received data from the analog-to-digital converter contains valid preambles, and wherein the adapter is configured to selectively transfer samples to the host processor in the event that the preamble detector detects a valid preamble.

17. The WLAN adapter of claim 15, wherein the WLAN adapter further comprises a host processor interface wherein the host processor interface allows communication between the adapter and the host processor.

18. The WLAN adapter of claim 15, wherein the baseband processor comprises:
a convolutional encoder;
a modulation recognition device;
an automatic gain control (AGC) dynamics and noise floor comparison matching device; and
an information combiner, wherein the information combiner accepts inputs from the convolutional encoder, the modulation recognition device, and the AGC dynamics and noise floor comparison matching device in order to determine if the data contains information destined for the host processor.

* * * * *

UNITED STATES PATENT AND TRADEMARK OFFICE
CERTIFICATE OF CORRECTION

| | |
|---|---|
| PATENT NO. | : 7,577,122 B1 |
| APPLICATION NO. | : 10/460684 |
| DATED | : August 18, 2009 |
| INVENTOR(S) | : Schultz et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1771 days.

Signed and Sealed this

Seventh Day of September, 2010

David J. Kappos
*Director of the United States Patent and Trademark Office*